United States Patent
Fellenstein et al.

(10) Patent No.: US 6,885,732 B2
(45) Date of Patent: Apr. 26, 2005

(54) VOICE MESSAGE VIGNETTES

(75) Inventors: Craig Fellenstein, Brookfield, CT (US); Carl Phillip Gusler, Austin, TX (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 10/383,851

(22) Filed: Mar. 6, 2003

(65) Prior Publication Data

US 2004/0174963 A1 Sep. 9, 2004

(51) Int. Cl.$^7$ ................................................. H04M 1/64
(52) U.S. Cl. .................... 379/68; 379/88.11; 379/88.16; 379/88.22
(58) Field of Search ........................ 379/67.1, 68, 88.11, 379/88.12, 88.16, 88.22, 88.23, 74, 88.25, 76, 77, 84; 455/412.01, 412.02, 413

(56) References Cited

U.S. PATENT DOCUMENTS

| | | | |
|---|---|---|---|
| 5,917,893 A | 6/1999 | Katz | 379/93.02 |
| 6,240,391 B1 | 5/2001 | Ball et al. | 704/270 |
| 6,335,962 B1 | 1/2002 | Ali et al. | 379/88.11 |
| 6,449,342 B1 * | 9/2002 | Johanson | 379/88.11 |

FOREIGN PATENT DOCUMENTS

| | | | | |
|---|---|---|---|---|
| WO | WO 0228068 A1 * | 4/2002 | | H04M/1/64 |

OTHER PUBLICATIONS

IBM Technical Disclosure Bulletin, Portable Voice Messaging System, vol. 38, No. 7 (Jul. 1, 1995) pp. 257–260.*

* cited by examiner

Primary Examiner—Fan Tsang
Assistant Examiner—Ovidio Escalante
(74) Attorney, Agent, or Firm—David A. Mims, Jr.; Robert V. Wilder

(57) ABSTRACT

A method and implementing processing system are provided in which, in addition to normal playback modes, users of voice mail devices are enabled to select a vignette playback mode in which shortened versions of received messages are played back to the user. In one embodiment, a user is able to have the shortened versions or vignettes played back sequentially without interruption. In another embodiment, the user may select to pause after each playback in order to manage or otherwise dispose of the played message. In yet another embodiment, the user is enabled to select vignette mode playback default values including, but not limited to, selecting which portion of received messages are to be played back, and the duration of each vignette message playback. The user is also enabled to input new vignette playback values in place of the default values for each received message or group of received messages. User inputs and menu options are implemented using any input and/or selection means including, but not limited to, voice recognition and voice processing methodologies, device button selection with reference to a displayed "soft" menu, voiced menu presentation from the receiving device, voiced input from a user, and/or wireless or hard-wired stylus input from a user.

18 Claims, 3 Drawing Sheets

VOICE MESSAGE VIGNETTES

FIELD OF THE INVENTION

The present invention relates generally to information processing systems and more particularly to a methodology and implementation for enabling voice message processing in electronic communication systems.

BACKGROUND OF THE INVENTION

Busy professionals continue to rely upon voicemail services, and in particular, the message taking and playback capabilities of voicemail when they are not available to take calls directly. It is common for a busy professional to receive upwards of a dozen voicemail messages in a single day. Often, throughout the day, an individual may check phone mail as opportunity arises, and save those messages which need to be reviewed again, or acted upon later. As a result of this scenario repeated over days and weeks, the task of sifting through messages can become quite cumbersome given the potential number of saved messages which might be present within a system at any given time.

Another shortcoming of currently available systems is apparent when a user is reviewing received messages. In dynamic situations, a user may wish to listen to messages received while engaging in other tasks. For example, a user may wish to review voice messages received by the user's wireless device in situations where the user will not have the time to totally focus upon the message play feature of a wireless device, for example, a cell phone. In most current voice message playback modes, each stored message must be played back in its entirety before the next message can be accessed. This wastes a lot of time especially in situations where the user is looking for a specific message which the user is expecting to receive. Even in hard-wired phone answering systems, a user is required to hit a "Fast Forward" button in order to move to the next stored message. This requires the user's full attention to be able to manually hit "Fast Forward" at the proper time after the user has listened to enough of a message to be able to determine that the user is not presently interested in the current message and wishes to move on to the next message. In many situations, a user wishes to quickly listen to the received messages for a particular expected message and is not able to apply his or her full attention to manipulating buttons on a wireless phone or other voice message receiving device.

Thus, there is a need for an improved methodology and system for enabling improved voice message processing in electronic communication systems.

SUMMARY OF THE INVENTION

A method and implementing processing system are provided in which, in addition to normal playback modes, users of voice mail devices are enabled to select a vignette playback mode in which shortened versions of received messages are played back to the user. In one embodiment, a user is able to have the shortened versions or vignettes played back sequentially without interruption. In another embodiment, the user may select to pause after each playback in order to manage or otherwise dispose of the played message. In yet another embodiment, the user is enabled to select vignette mode playback default values including, but not limited to, selecting which portion of received messages are to be played back, and the duration of each vignette message playback. The user is also enabled to input new vignette playback values in place of the default values for each received message or group of received messages. In accordance with the present invention, user inputs and menu options may be implemented using any input and/or selection means including, but not limited to, voice recognition and voice processing methodologies, device button selection with reference to a displayed "soft" menu, voiced menu presentation from the receiving device, voiced input from a user, and/or wireless or wired stylus input from a user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
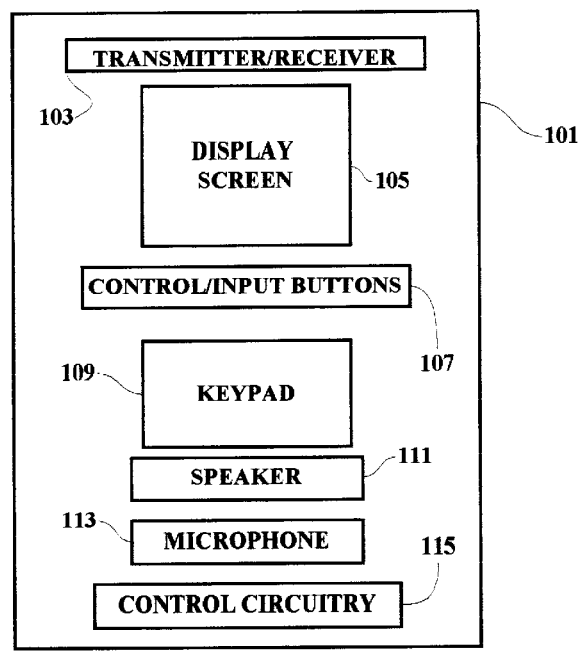
FIG. 1 is an illustration of a voice mail receiving device which may be used in an exemplary implementation of the present invention.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within any communication device capable of receiving and playing voice messages. Such devices include, but are not limited to, cellular and other wireless devices, laptop and personal computers and also desk top telephone answering machines and server networks. The present discussion will be directed to a cellular phone system although it is understood that the principles involved in the present invention may be applied, inter alia, to all of the above noted voice message receiving and playing systems.

One exemplary method for improving the efficiency of message processing in accordance with the present invention, is to add an option to existing phone mail systems allowing automated partial playback of the beginning or end of messages. Note that this differs from existing systems by not stipulating that operator intervention be required. Rather, the option available to the user would be that of "cascading message vignettes," allowing the listener to quickly identify a message and act upon it. Whereas today's legacy voicemail systems may be thought of as analogous to reading a correspondence in its entirety, the present invention allows a default mode in which selected portions of the voice mail are quickly played to allow the user a rapid search function to locate what he or she wants. In another embodiment, the voicemail user would be able to quickly and automatically hear a few seconds of voice from each message, and elect, via depression of a button to stop this fast-forwarding mode and listen to a chosen message in its entirety.

Once a user enters the phone mail system and selects playback of either new or old messages, options could be presented to; "listen to message beginnings", or "listen to message endings". Alternatively, this could be established as the primary listening mode for a given user. A secondary menu option might then allow the user to choose, in seconds or any other units, the duration of message, i.e., the length of the vignette, to which he or she wishes to listen. All of the other standard message options could remain in effect during this abbreviated playback period. The user would also have the option, at any time, to switch between listening to the beginning and/or the ending of a message(s). Additionally, while listening to the beginning of a message, the user could give a voice command, or depress a key to listen to the message in its entirety. If the user was listening to the end of the message, making the selection to hear the entire message would cause the message to re-cue to the beginning and play all the way through. This would be very useful in obtaining name and phone data of callers, as this information is typically left at very beginning, and very end of messages. User inputs and menu options may be implemented using any input and/or selection means including, but not limited to, voice recognition and voice processing methodologies, device button selection with reference to a displayed "soft" menu, voiced menu presentation from the receiving device, voiced input from a user, and/or wireless or wired stylus input from a user.

In FIG. 1, the illustrated exemplary wireless device 101 includes a transmitter/receiver section or module 103, a display screen or display area 105, control input buttons 107, a keypad 109, a speaker 111, a microphone 113 and control circuitry 115. The control buttons 107 include typical navigational controls used to enable to navigate through menus presented on the display 105 and select one or more of the items presented on the displayed menus. The display area 105 may be touch-sensitive to enable a user to select items from a displayed menu using a wired-in or unattached stylus device (not shown).

Figure 2:
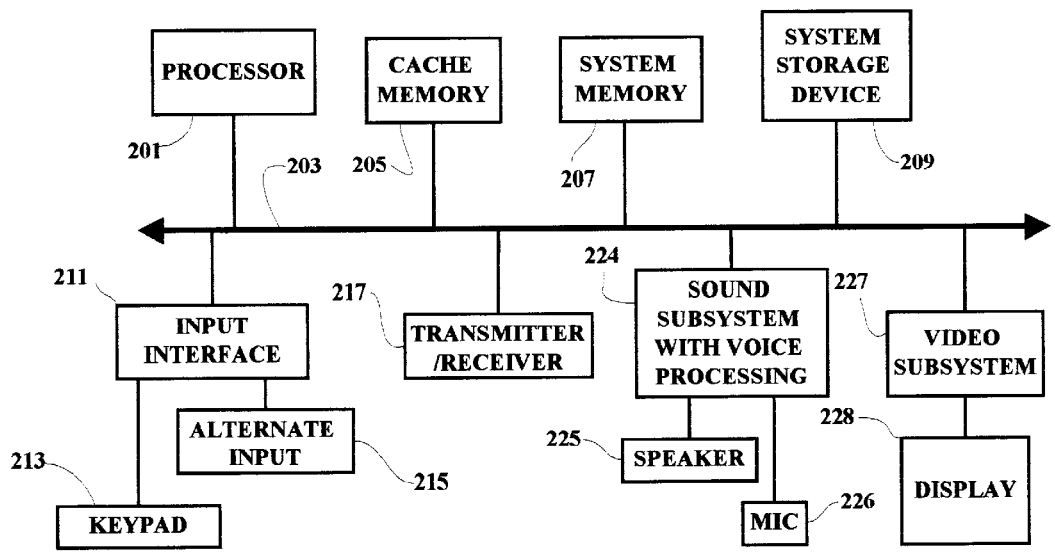
FIG. 2 is a schematic block diagram illustrating several of the major components of an exemplary voice mail receiving device.

Several of the major components of the device 101 are illustrated in FIG. 2. A processor circuit 201 is connected to a system bus 203. It is noted that the processing methodology disclosed herein will apply to many different bus and/or network configurations and is not limited to the configuration of the present example. A cache memory device 205 and a system memory unit 207 are also connected to the bus 203. The exemplary system also includes a system storage device 209. The system bus 203 is also connected through an input interface circuit 211 to a keypad 213 as well as alternate input devices 215 which may include voice and/or stylus input devices. The bus 203 is also coupled to a transmitter/receiver section 217 which enables the receipt and transmission of voice messages. The illustrated system may also be coupled to a network system through the transmitter/receiver section 217. The exemplary voice message receiving device also includes a sound subsystem 224 which further includes voice processing circuitry. Input means such as a microphone 226 and output means such as speaker 225 enable a user to communicate with the device using voice commands and voiced menu and message playbacks. A video subsystem 227, which may include a graphics subsystem, is connected between the bus 203 and a display device 228.

Figure 3:
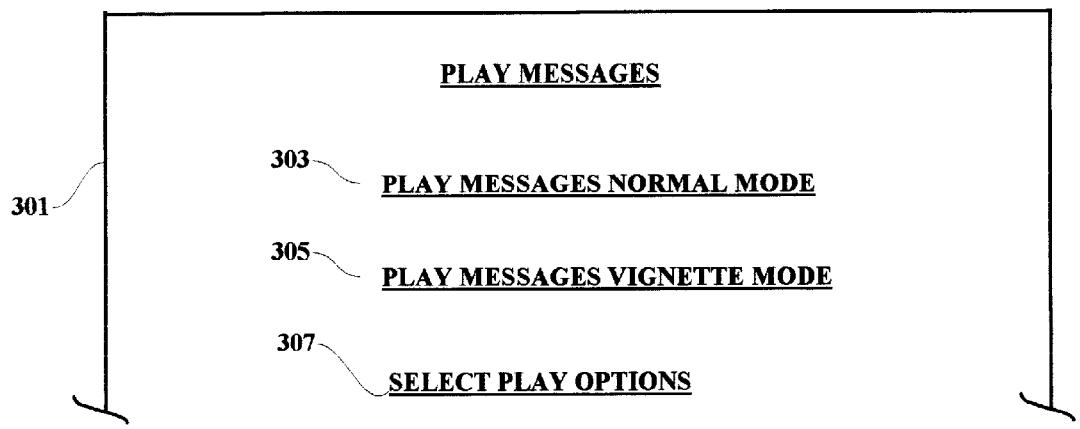
FIG. 3 is an illustration of a display screen which may be used to select one of several modes of operation in an exemplary embodiment of the present invention.

An exemplary "Play Messages" menu 301 is illustrated in FIG. 3 and would selectively appear on the display screen 105 of the device 101, for example, when voicemail messages have been received and are ready to be played. As shown, a user is enabled to select from displayed "Play Message" modes of operation. The presented options in the example include a Normal Mode Play option 303 which, if selected by a user would enable the user to play received messages in a normal mode where each received message is played back in its entirety and in the sequence received. A user may also select a "Play Message Vignette Mode" 305 which if selected by the user enables the user to play received messages in a vignette or shortened format in which the entire message is not played but rather only a selected portion of the message is played back to the user. In a preferred embodiment, a user may switch between the normal mode and the vignette mode at any time during a playback of a message. If a user is listening to messages being played back in normal mode and switches to vignette mode, the messages played back to the user after that selection will be played in the vignette or shortened format. Similarly, if a message is being played in the vignette mode and the normal mode is selected, the currently playing message will be reloaded and played in its entirety. This allows a user to quickly move through shortened versions of received messages until a message of particular interest is heard at which time the user will select "Normal Mode" to have the entire current voice message played back to the user.

Another possible selection as shown in FIG. 3 is a "Select Play Options" 307 which enables a user to select and input certain options relating to the playing of received messages. An activation of the "Select Play Options" menu item will cause the presentation of the menu 401 illustrated in FIG. 4. The selections presented in Figure may be chosen by a user by manipulating a menu up/down selector switch until the selected menu item is highlighted and then actuating an "Enter" button. Both the up/down menu item selector switch and the Enter button are part of the controller button section 107 of the receiver device 101 in the present example.

Figure 4:
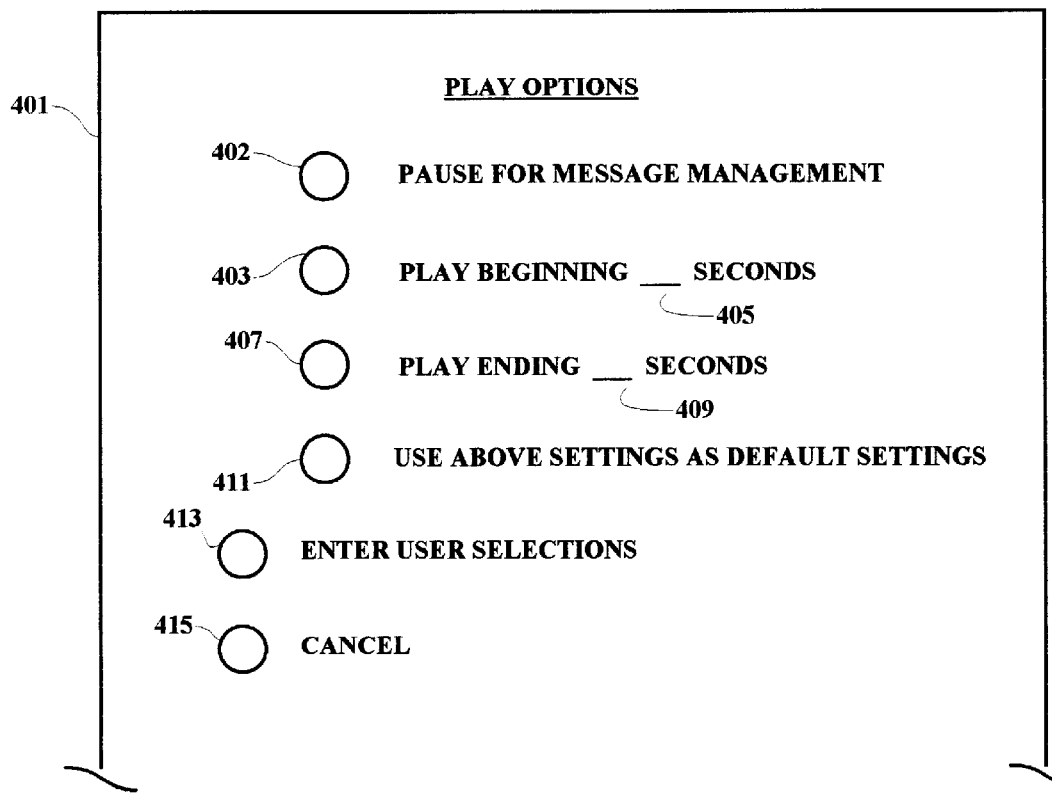
FIG. 4 is an illustration of an exemplary display screen which may be implemented to enable a user to select one or more various voice message play modes and play options available to the user.

As shown in FIG. 4, when the "Select Play Options" selection is made, the user is enabled to select whether or not to pause 402 between playing received messages in order to allow the user to dispose of or otherwise manage the previously played voice message. This selection applies to both the normal playback mode as well as the vignette playback mode. The next two selections 403 and 407 apply to the vignette mode only. Selection 403 enables a user to play only the beginning of a received voicemail message instead of the entire message. The user is also enabled to select how long each message will play from the beginning of the message. This is accomplished by enabling the user to input the number of seconds 405 each vignette voice message will play from the beginning of the message. Similarly, the user may choose to play only an input number of seconds 409 immediately preceding the end of each received message 407. The user may make a selection 411 to have the above inputs used as default settings so that when the user selects to play received messages in the vignette mode, for example, the default settings are automatically applied to the playing of the received messages in the vignette mode until the values are changed by the user or the user switches to the normal full message mode. After the pause and/or vignette mode default selections have been input, a user may either enter 413 the values selected, or cancel 415 the input operation.

Figure 5:
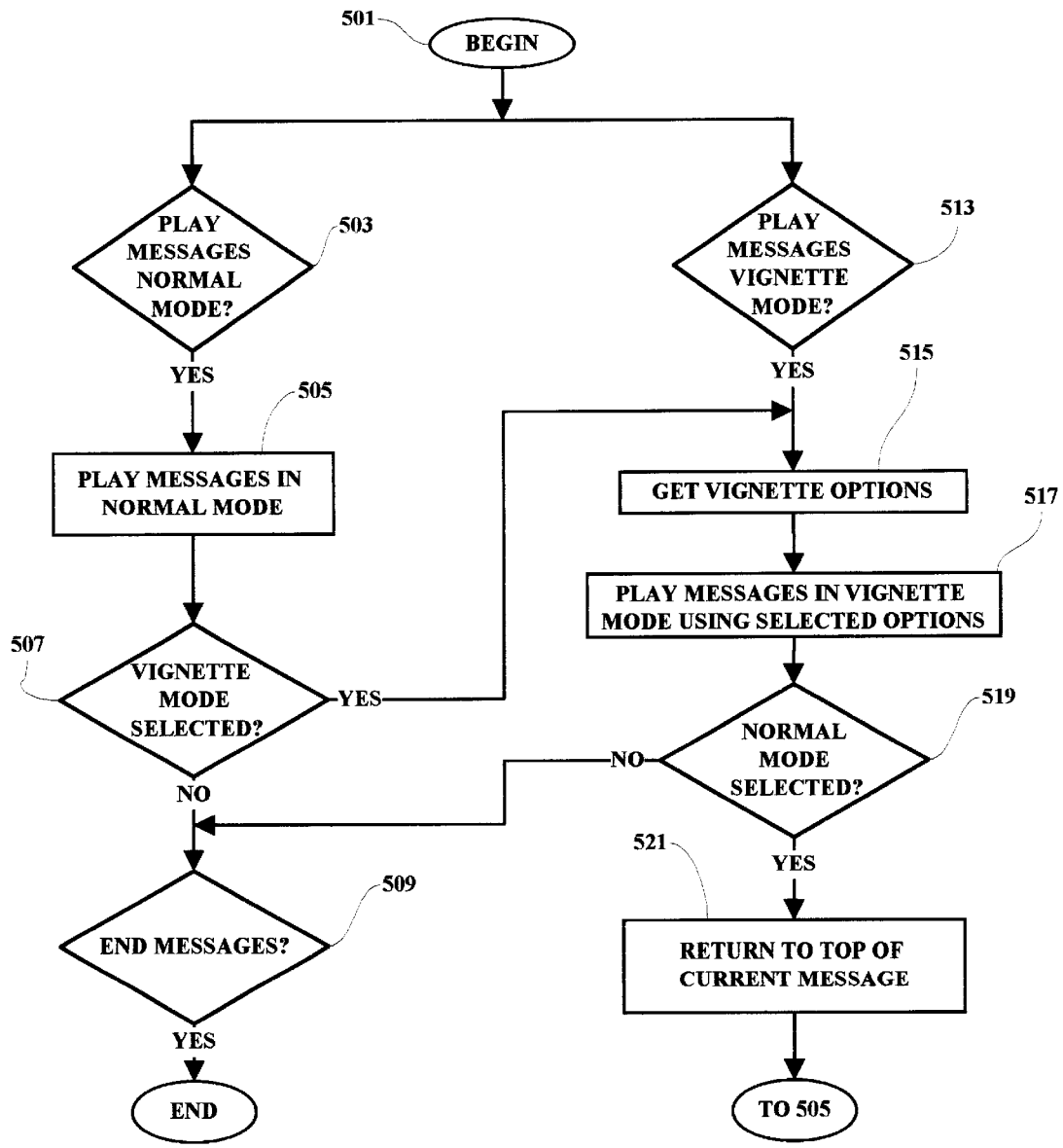
FIG. 5 is a flow chart illustrating an exemplary flow or operational sequence of an exemplary embodiment of the present invention.

An exemplary flow sequence which may be used in an implementation of the present invention is illustrated in FIG. 5. As illustrated, when the processing begins 501, a check is made to determine whether a normal mode play selection 503 or vignette mode play selection 513 has been made by the user. If a normal mode play selection has been made 503 the received voicemail messages are played in normal mode, i.e. the full messages are played in the sequence received. If the vignette mode option 305 is selected 507 by the user while a message is being played in the normal mode, the vignette options are retrieved and subsequent messages are played in the vignette mode. If the vignette mode is not selected 507 while the received voicemail messages are being played in the normal mode, then after all of the received messages have been played, an end messages flag is detected 509 and the processing ends.

If a vignette mode play selection has been made 513, the vignette options (e.g. 403 and 407) are retrieved 515 and the voicemail messages are played in the vignette or shortened format using the selected options 517. If a normal mode selection is not made 519 while the messages are being played in the vignette mode, then all of the messages are played in the vignette mode until an End of Messages flag is detected 509 and the process is ended. If the normal mode is selected 519 while one of the messages is being played in the vignette mode, then the currently playing message is re-queued 521 and played from the beginning of the message in the normal mode 505. Thus a user is enabled to quickly move through shortened versions of voicemail messages received until one of particular interest is detected at which time the user may switch to a normal mode to hear the message of interest in its full content. Depending upon the user Pause Selection 402 in the Play Options Menu 401, the above processing may be continuous or may be interrupted after each message playback to allow for message management options, in either normal or vignette modes of operation.

User inputs and menu options may be implemented using any input and/or selection means including, but not limited to, voice recognition and voice processing methodologies, device button selection with reference to a displayed "soft" menu, voiced menu presentation from the receiving device, voiced input from a user, and/or wireless or wired stylus input from a user.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in a portable or fixed memory device, such as so-called "Flash" memory, from which it may be loaded into other memory devices and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing original digitized voice messages which have been stored in a memory device for subsequent playing of said original voice messages, said method comprising:

enabling a presentation to a user of a user preference selection screen on a user display device;

enabling said user to provide a first input to said user preference selection screen, said first input being representative of a user selection to playback a shortened version of said original digitized voice message, said shortened version containing only a portion of said original digitized voice message; enabling said user to provide a second input to said user preference selection screen, said second input being representative of a user-selected time duration for said shortened version enabling a generation of a first play command to play said shortened version of said original digitized voice message; and enabling a playing said shortened version of said original digitized voice message in response to said first play command.

2. The method as set forth in claim 1 wherein said shortened version comprises a user-selected predetermined portion of said original digitized voice message.

3. The method as set forth in claim 2 and further including:

enabling a user selection of said predetermined portion from said user preference selection screen.

4. The method as set forth in claim 3 wherein said predetermined portion comprises a duration of a selectable number of seconds starting with a beginning of said original digitized voice message.

5. The method as set forth in claim 3 wherein said predetermined portion comprises a duration of a selectable number of seconds preceding an ending of said original digitized voice message.

6. The method as set forth in claim 1 and further including:

enabling a generation of a second play command, said second play command being representative of a command to play said original digitized voice message in a full message version wherein said original digitized voice message is played in its entirety; and enabling a playing said original digitized voice message in its entirety in response to said second play command.

7. The method as set forth in claim 6 and further including:

enabling a user selection to initiate said first play command or said second play command at any time while said original digitized voice message is being played in either said shortened version or said full message version.

8. The method as set forth in claim 7 and further including:

enabling a replaying a selected original digitized voice message in said full message version if said second play command is initiated during a playing of said selected original digitized voice message in said shortened version.

9. The method as set forth in claim 1 and further including:

enabling a user selection of predetermined characteristics of said shortened version of said original digitized voice message.

10. The method as set forth in claim 9 and further including:

using said selected predetermined characteristics selected by a user as default values to be used in playing said shortened version of said original digitized voice message.

11. The method as set forth in claim 1 and further including:
 playing a series of said shortened versions of said original digitized voice messages without interruption between individual ones of said shortened versions of said original digitized voice messages in response to said first play command.

12. The method as set forth in claim 1 and further including:
 playing a series of said shortened versions of said original digitized voice messages in response to said first play command and pausing between each of said shortened versions, said method further including enabling a user to selectively dispose of selected ones of said original digitized voice messages during said pausing.

13. The method as set forth in claim 6 and further including:
 playing a series of said full message version of said original digitized voice messages without interruption between individual ones of said original digitized voice messages in response to said second play command.

14. The method as set forth in claim 6 and further including:
 playing a series of said full message versions of said original digitized voice messages in response to said second play command and pausing between each of said full message versions, said method further including enabling a user to selectively dispose of selected ones of said original digitized voice messages during said pausing.

15. A storage medium including machine readable coded indicia, said storage medium being selectively coupled to a voice message processing system, said voice message processing system including processing circuitry selectively operable to read said machine readable coded indicia and provide program signals representative thereof, said program signals being effective to enable processing of original digitized voice messages by accomplishing the steps of:
 enabling a presentation to a user of a user preference selection screen on a user display device;
 enabling said user to provide a first input to said user preference selection screen, said first input being representative of a user selection to play back a shortened version of said original digitized voice message, said shortened version containing only a portion of said original digitized voice message;
 enabling said user to provide a second input to said user preference selection screen, said second input being representative of a user-selected time duration for said shortened version
 enabling a generation of a first play command to play said shortened version of said original digitized voice message; and
 enabling a playing said shortened version of said original digitized voice message in response to said first play command.

16. A voice message processing system comprising:
 means for enabling a presentation to a user of a user preference selection screen on a user display device;
 means for enabling said user to provide a first input to said user preference selection screen, said first input being representative of a user selection to playback a shortened version of said original digitized voice message, said shortened version containing only a portion of said original digitized voice message;
 means for enabling said user to provide a second input to said user preference selection screen, said second input being representative of user-selected time duration for said shortened version
 means for receiving an original voice message and storing said message as an original digitized voice message;
 means for enabling a generation of a first play command to play a shortened version of said original digitized voice message;
 enabling a playing said shortened version of said original digitized voice message in response to said first play command.

17. The system as set forth in claim 16 wherein a plurality of said shortened versions are played without interruption in response to said first play command.

18. The system as set forth in claim 16 and further including:
 means for enabling a generation of a second play command, said second play command being representative of a command to play said original digitized voice message in a full message version wherein said original digitized voice message is played in its entirety; and
 enabling a playing said original digitized voice message in its entirety in response to said second play command.

* * * * *